Patented Dec. 8, 1953

2,662,070

UNITED STATES PATENT OFFICE 2,662,070

QUICK CURING POLYESTER RESINS

Peter Kass, Wilmington, and Baak W. Lew, Arden, Del., assignors to Atlas Powder Company, Wilmington, Del., a corporation of Delaware No Drawing. Application October 14, 1950, Serial No. 190,240

12 Claims. (Cl. 260—45.4)

This invention relates to polyester resins and more particularly to solid pulverulent polyester resins which are curable and which may be copolymerized with other polymerizable bodies.

In copending application Serial No. 92,746, filed May 11, 1949 by one of us, there is disclosed a class of new and useful resins which are thermoplastic, high melting solids, sufficiently hard and friable at room temperature that they may be pulverized and stored without blocking, autopolymerizable under the influence of known curing catalysts and copolymerizable with styrene or other vinyl compounds to yield valuable casting and laminating resins. The so described resins are basically polyesterification products of ethene dicarboxylic acids and dihydric alcohols conforming to the formula

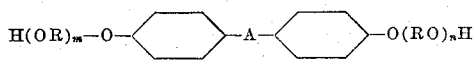

wherein R is an alkylene radical containing from 2 to 3 carbon atoms, A is a 2-alkylidene radical containing from 3 to 4 carbon atoms, $m$ and $n$ are each at least one, and the average sum of $m$ and $n$ is not over 3.

In application Serial No. 190,239 filed of even date herewith by one of us there is disclosed a class of resins of improved resistance to heat distortion which are basically linear polyesters of ethene dicarboxylic acids with mixed diols, each said mixed diol consisting of a major proportion of a diol as described in the before mentioned earlier application and a minor proportion of a lower glycol.

It is the object of the present invention to provide polyesters having the desirable physical properties of the resins disclosed in the above mentioned applications, said polyesters being further characterized by the rapidity with which they undergo autopolymerization under the influence of known curing catalysts such as organic peroxides, stannic halides, cobalt nitrate, and the like.

We accomplish this object by producing polyesters from substantially stoichiometric amounts of an ethene dicarboxylic acid and a mixed polyol consisting of (a) at least 50 mol per cent of a diol conforming to the formula

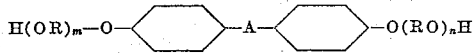

wherein the symbols have the meanings ascribed to them hereinbefore; (b) from about 1 to about 10 mol per cent of an aliphatic polyhydric alcohol containing from 3 to 6 carbon atoms and at least 3 hydroxyl groups, and (c) from 0 to about 49 mol per cent of a lower alkylene glycol selected from the group consisting of ethylene glycol, diethylene glycol, propylene glycol and dipropylene glycol.

The said ethene dicarboxylic acids are fumaric acid and maleic acid. The polyesters of our invention may be esters of either of these acids or of a mixture of the two. Throughout this specification and in the appended claims the term dicarboxylic acids is to be understood to include anhydrides of such acids where such anhydrides exist, and derivatives of such acids which yield dicarboxylic acid radicals under esterifying conditions. For example, lower alkyl esters of the dicarboxylic acids are full equivalents of the acids themselves for purposes of this application.

Diols conforming to the formula cited above, and useful in preparing the quick curing resins of the present invention, are fully described in the abovementioned earlier copending application, wherein methods for their preparation are also indicated. Among such diols we may mention specifically 2.2-di-(4-beta hydroxyethoxyphenyl)-propane, 2.2-di-(4-beta, hydroxyethoxyphenyl)-butane, the polyoxyethylene ether of isopropylidene diphenol wherein both phenolic hydroxyls are oxyethylated and the average number of oxyethylene groups per mol is 2.6, the polyoxypropylene ether of 2-butylidene diphenol wherein both phenolic hydroxyls are oxyalkylated and the average number of oxypropylene groups per mol is 2.5.

As the second named component of the mixed polyol of the polyester resins of our invention we employ higher polyhydric alcohols, that is, polyhydric alcohols of functionality greater than 2. They are selected from the aliphatic polyhydric alcohols containing from 3 to 6 carbon atoms and at least 3 hydroxyl groups, among which compounds may be named glycerol, pentaerythritol, sorbitol, mannitol, sorbitan, erythritol, and the like. Of the compounds so defined glycerol is the preferred species. As the content of said higher polyhydric alcohol in the mixed polyol increases, the rate of autopolymerization of the resulting resin under the influence of the usual curing catalysts is increased. If excessive amounts are employed, however, there is a tendency for the resins to gel in the reaction vessel before polyesterification has been carried to a satisfactory extent. To avoid such gelation we employ not more than 10 mol per cent of said higher polyhydric alcohol in the esterifying polyol, and preferably employ not more than 6 mol per cent. Significant increase in the curing rate is noticed when as little as one mol per cent of the polyol is the higher polyhydric alcohol although we generally prefer to use at least 2 mol per cent to enhance the effect.

In addition to the bisphenolic ether diol and the higher functional polyhydric alcohol components, the mixed polyol of the esters of our invention may alternatively include minor proportions, i. e. up to 49 mol per cent on the polyol, of a lower glycol selected from the group consisting of ethylene glycol, diethylene glycol, propylene glycol and dipropylene glycol. Particularly, in the preparation of resins for use in copolymerization with vinyl polymers such, for example, as styrene, it is advantageous to employ lower glycols in the polyol. We find that we thereby obtain copolymers which cure rapidly, and show remarkably little heat distortion. As the proportion of said lower glycol is increased there is a tendency for the polyester resin to become lower melting and less readily grindable. In the entire range of concentrations above disclosed, however, useful pulverulent resins are obtainable.

In preparing polyester resins from the components above described we carry the esterification reaction forward to the point where the resin forms a clear pill with a melting point by the ASTM ball and ring method of at least 80° C., and preferably at least 90° C. With the reactants herein disclosed, polyesters of these high melting points are obtained easily without carrying the degree of esterification into the range of super polyester formation. The resulting resins have acid numbers ranging downward from 30, and like the resins disclosed in the copending applications identified hereinbefore, are hard, pulverulent solids at ordinary temperatures. They are miscible over wide ranges of concentration with styrene and other low molecular weight aromatic compounds and may be copolymerized with styrene and other vinyl compounds to yield valuable laminating and casting resins.

The polyester resins of our invention may be prepared by esterification techniques well known in the art. Preferably, we charge the dicarboxylic acid and the diol components of the mixed polyol into a reaction vessel and heat in an inert atmosphere at substantially atmospheric pressure until the esterification is from 70% to 80% complete. This point may readily be determined by following the acid number of the charge or by condensing and measuring the evolved water of esterification. The polyhydric alcohol of higher functionality is then added and heating continued until the desired high melting point is reached. It is frequently desirable to apply vacuum in the later stages of the esterification to facilitate removal of the formed water. Esterification catalysts may be employed if desired although we generally prefer to carry out the reaction in the absence of such agents to avoid contamination of the final resinous product with catalyst residue. We find it frequently desirable to have present in the charge during esterification a small amount of polymerization inhibitor such as pyrogallol, hydroquinone, or the like, to minimize double bond polymerization during the resin formation.

Preparative details of the formation of specific polyester resins in accordance with our invention are presented in the following illustrative examples.

Example I

A flask fitted with an agitator, means for maintenance of an inert atmosphere, means for applying vacuum and means for condensing and measuring evolved water was charged with 150.6 grams of 2,2-di(4-hydroxypropoxyphenyl) propane, 53.3 grams of fumaric acid and 0.04 gram of hydroquinone. The charge was heated and agitated in an inert atmosphere for 1.5 hours at 185 to 190° C. and an additional 3 hours at 210 to 215° C. at which time 70% of the theoretical water had been evolved. 2.4 grams of pentaerythritol was added to the reaction mixture and heating continued for one more hour at 210° to 215° C. after which a vacuum of 7 mm. was applied and the reaction carried on at the same temperature for another hour. The final product was a clear, light colored resin, hard and brittle at room temperature and melting, by the ASTM ball and ring method at 118° C.

Example II

A reaction kettle fitted with an agitator, means for maintenance of an inert atmosphere, means for applying vacuum and means for condensing and measuring evolved water was charged with 275 lbs. of 2,2-di(4-beta hydroxy ethoxy phenyl)-propane, 104 lbs. 6 oz. of fumaric acid and 32 grams of hydroquinone. The charge was heated and agitated in an atmosphere of carbon dioxide at a temperature of 180 to 185° C. until 50% of the theoretical water was evolved, after which the temperature was raised to 205° to 210° C. and the reaction continued until 75% of the theoretical water had been collected. 3 lbs. 6 oz. of glycerol was then added and heating continued at the same temperature until the acid number of a withdrawn sample was down to 30. A vacuum of 9 mm. was then applied and the reaction continued at 205 to 215° C. until the resin had a melting point by the ASTM ball and ring method of 120° C.

Example III

A flask fitted with an agitator, means for maintenance of an inert atmosphere, means for applying vacuum and means for condensing and measuring evolved water was charged with 150.4 grams of 2,2-di-(4-beta hydroxy ethoxy phenyl)-propane, 28.8 grams of ethylene glycol, 108 grams of fumaric acid and 0.06 gram of hydroquinone. The charge was heated and agitated in an inert atmosphere for 2 hours at 180° C. and for 45 minutes at 195° C. An additional 9 grams of fumaric acid was added and the reaction continued for 15 minutes at 195° C. and another 15 minutes at 210° C. At this point 70% of the theoretical amount of water had been evolved. 5.3 grams of pentaerythritol was added to the reaction mixture and heating at 210° was continued for another hour. The resin formed by the process had an acid number of 30 and a melting point of 110° C. It was clear, light tan in color, and was hard and friable at room temperature.

Example IV

A flask fitted as in Example III above was charged with 1287 grams of 2,2-di(4-beta hydroxy ethoxy phenyl)-propane, 109 grams of propylene glycol, 638 grams of fumaric acid and 1.02 grams of hydroquinone. The temperature of the charge was taken from 175° C. to 185° C. over a period of 6 hours in an inert atmosphere and under continuous agitation. 20 grams of glycerol was then added and reaction continued at 185° C. for 1.5 hours. A vacuum of 15 mm. was then applied and the reaction continued for 3 hours at 185° C. The product of the reaction was a hard, friable, clear resin, tan in color, with an acid number of 23 and a melting point of 110° C.

The effect on the curing rate of incorporating successively greater amounts of a higher functional polyhydric alcohol in polyesters wherein the diol is a dihydroxyalkylene ether of bisphenol is indicated in Table I. A series of resins were prepared employing fumaric acid as the ethene dicarboxylic acid and the polyoxypropylene ether of isopropylidene diphenol containing two oxypropylene groups per mol as the diol. The several resins were modified by incorporating from 0 to 10 mol per cent of pentaerythritol in the esterifying polyol in accordance with the hereinbefore described technique. The rate of cure of each resin was determined by intimately mixing it in powdered form with 4% of its own weight of stannic chloride pentahydrate and placing a small quantity of the mixture on a metal plate maintained at a temperature of 200° C. The time required for the resin to undergo cure is tabulated, the ranges of times indicating the period from the first evidence of gelation to the development of complete infusibility. In the table the resins are further characterized by their melting points.

TABLE I

| Mol Percent P. E. in Esterifying Polyol | Melting Point of Resin, ° C. | Curing Time in Seconds |
| --- | --- | --- |
| 0 | 116 | 60 to 120 |
| 1 | 122 | 25 to 50 |
| 4 | 118 | 15 to 30 |
| 10 | 121 | 10 to 20 |

Table II shows the effect of 4 mol per cent of glycerol on the cure time when replacing an equivalent quantity of the diol, 2,2-di-(beta hydroxy ethoxy phenyl)-propane in a fumarate polyester as the extent of esterification is varied by reacting to successively higher melting points. The cure time was determined as described hereinbefore.

TABLE II

| Unmodified Resin | | 4 mol Percent Glycerol Modified Resin | |
| --- | --- | --- | --- |
| M. P. of Resin, ° C. | Cure Time, Min. | M. P. of Resin, ° C. | Cure Time, Min. |
| 87 | 3.7 to 4.8 | 84 | 2.7 to 3.5 |
| 97 | 3.0 to 4.6 | 94 | 1.3 to 1.9 |
| 101 | 1.9 to 3.0 | 102 | 0.8 to 1.1 |
| 109 | 1.2 to 2.0 | 107 | 0.7 to 1.0 |

It is apparent that for a resin of given melting point the modification shown approximately halves the curing time. The increased curing rate so obtained is of decided importance in the utilization of the resins under consideration, and may well represent the difference between utility and non-utility in many applications.

The quick curing resins made in accordance with our invention are of especial utility in the preparation of resinous mats of felted fibrous materials, such for example, as glass fibers. The resin intimately mixed with a suitable curing catalyst may be deposited in the felt by any suitable means, such, for example, as drawing the latter through a chamber in which a suspension of the powdered resin-catalyst mixture is maintained by a turbulent air flow. Upon subsequent passage of the felt through a curing chamber at elevated temperature the resin is first melted then cured to the insoluble-infusible state, cementing the fibers together at points of intersection in the felt.

It will be obvious to those skilled in the art that minor modifications can be made in the polyester resins herein disclosed without departing from the spirit of the invention. The physical properties of the resin may be modified, for example, by replacing a minor proportion of the ethene dicarboxylic acid radical with a stoichiometrically equivalent amount of a different acid radical saturated or unsaturated, polybasic or monobasic. Similarly, minor proportions of the alcohol radical may be replaced by stoichiometric quantities of other alcohols, monohydric or polyhydric. Resins so modified are the full equivalent of the unmodified resins described in detail provided the resin consists essentially of the esterification product of the named dicarboxylic acids and mixed polyols, reacted to the extent that the products are thermoplastic, hard and friable at ordinary temperatures, with melting points of 80° C. or higher.

It has been mentioned hereinbefore that the quick curing polyester resins here disclosed may be copolymerized with polymerizable vinyl compounds. Among such copolymers are the insoluble, infusible resinous products obtained by copolymerizing, under curing conditions, from about 25% to about 75% by weight of a polymerizable monomeric vinyl compound and from about 75% to 25% of said polyester. More particularly, attention is directed to such insoluble, infusible resinous products wherein the said polyester has a melting point of at least 90° C., and is a 1,2 dicarboxy ethene ester of a mixed polyol consisting of (a) at least 50 mol percent of a diol conforming to the formula hereinbefore presented, (b) about 4 mol percent of glycerol, and (c) from 0 to about 46 mol percent of ethylene glycol. A specific example of such a copolymer is that from about 40% of styrene with about 60% of the fumarate of a mixed polyol consisting of about 71 mol per cent of 2,2 di-(4 hydroxy propoxy phenyl)-propane, about 4 mol percent of glycerol and about 25 mol percent of ethylene glycol.

Having described our invention in detail and having illustrated specific embodiments thereof we claim:

1. A thermoplastic, curable, resinous esterification product of 1,2-dicarboxy ethene with a substantially stoichiometrically equivalent quantity of a mixed polyol consisting of (a) at least 50 mol per cent of a diol conforming to the formula

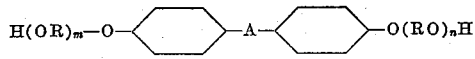

wherein R is an alkylene radical having from 2 to 3 carbon atoms, A is a 2-alkylidene radical having from 3 to 4 carbon atoms, $m$ and $n$ are each at least one and the average sum of $m$ and $n$ is not over 3, (b) from about 1 mol per cent to about 10 mol per cent of a polyhydric alcohol containing from 3 to 6 carbon atoms and at least 3 hydroxyl groups, and (c) from 0 to 49 mol per cent of a lower glycol selected from the group consisting of ethylene glycol, diethylene glycol, propylene glycol and dipropylene glycol, said product having a melting point of at least 80° C.

2. A thermoplastic, curable resinous esterification product of 1,2-dicarboxy ethene with a substantially stoichiometrically equivalent quantity of a mixed polyol consisting of from about 99 mol per cent to about 90 mol per cent of a diol conforming to the formula

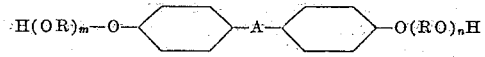

wherein R is an alkylene radical having from 2 to 3 carbon atoms, A is a 2-alkylidene radical having from 3 to 4 carbon atoms, $m$ and $n$ are each at least one, and the average sum of $m$ and $n$ is not over 3; and from about one mol per cent to about 10 mol per cent of a polyhydric alcohol containing from 3 to 6 carbon atoms and at least 3 hydroxyl groups, said product having a melting point of at least 90° C.

3. A thermoplastic, curable, resinous esterification product of 1,2-dicarboxy ethene with a substantially stoichiometrically equivalent quantity of a mixed polyol consisting of from about 98 to about 94 mol per cent of a diol conforming to the formula

wherein R is an alkylene radical having from 2 to 3 carbon atoms, A is a 2-alkylidene having from 3 to 4 carbon atoms, $m$ and $n$ are each at least one, and the average sum of $m$ and $n$ is not over 3; and from about 2 to about 6 mol per cent of glycerol, said product having a melting point of at least 90° C.

4. A thermoplastic, curable, resinous esterification product of fumaric acid with a substantially stoichiometrically equivalent quantity of a mixed polyol consisting of about 96 mol per cent of 2,2-di-(4-beta hydroxy ethoxy phenyl)-propane and about 4 mol per cent of glycerol, said product having a melting point of at least 90° C.

5. A thermoplastic, curable, resinous esterification product of 1,2-dicarboxy ethene with a substantially stoichiometrically equivalent quantity of a mixed polyol consisting of (a) at least 50 mol per cent of a diol conforming to the formula

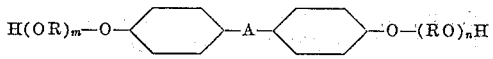

wherein R is an alkylene radical having from 2 to 3 carbon atoms, A is a 2-alkylidene radical having from 3 to 4 carbon atoms, $m$ and $n$ are each at least 1 and the average sum of $m$ and $n$ is not over 3, (b) from about 2 to about 6 mol per cent of polyhydric alcohol containing from 3 to 6 carbon atoms and at least 3 hydroxyl groups, and (c) from 0 to about 48 mol per cent of ethylene glycol, said product having a melting point of at least 90° C.

6. A thermoplastic, curable, resinous esterification product of 1,2-dicarboxy ethene with a substantially stoichiometrically equivalent quantity of a mixed polyol consisting of (a) at least 50 mol per cent of a diol conforming to the formula

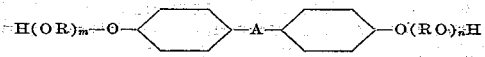

wherein R is an alkylene radical having from 2 to 3 carbon atoms, A is a 2-alkylidene radical having from 3 to 4 carbon atoms, $m$ and $n$ are each at least one and the average sum of $m$ and $n$ is not over 3, (b) about 4 mol per cent of glycerol; and (c) from 0 to about 46 mol per cent of ethylene glycol; said product having a melting point of at least 90° C.

7. A thermoplastic, curable, resinous esterification product of fumaric acid with a substantially stoichiometrically equivalent quantity of a mixed polyol consisting of about 71 mol per cent of 2,2-di(4 hydroxy propoxy phenyl)-propane; about 4 mol per cent of glycerol; and about 25 mol per cent of ethylene glycol, said product having a melting point of at least 90° C.

8. The insoluble, infusible resinous product obtained by heating the product of claim 1 under curing conditions.

9. The insoluble, infusible resinous product obtained by heating the product of claim 4 under curing conditions.

10. The insoluble, infusible resinous product obtained by copolymerizing, under curing conditions, from about 75% to about 25% by weight of the product of claim 1 with from about 25% to about 75% by weight of a polymerizable monomeric vinyl compound.

11. The insoluble infusible resinous product resulting from the copolymerization under curing conditions, of from about 75% to about 25% by weight of the product of claim 6 with from about 25% to about 75% by weight of a polymerizable vinyl monomer.

12. The insoluble, infusible resinous product resulting from the copolymerization, under curing conditions, of about 60% of the product of claim 7 with about 40% of styrene.

PETER KASS.
BAAK W. LEW.

References Cited in the file of this patent
UNITED STATES PATENTS

| Number | Name | Date |
|---|---|---|
| 2,437,046 | Rothrock et al. | Mar. 2, 1948 |
| 2,511,621 | Condit | June 13, 1950 |

OTHER REFERENCES

Schmidt & Marlies, Principles of High Polymer Theory & Practice, McGraw Hill, 1948, page 623.